United States Patent
Budman

[11] Patent Number: 6,003,470
[45] Date of Patent: Dec. 21, 1999

[54] RECREATIONAL AND AMUSEMENT DEVICE FOR ANIMALS

[75] Inventor: Sandra Budman, Rockville, Md.

[73] Assignee: Horseballs, Ltd., Rockville, Md.

[21] Appl. No.: 09/157,932

[22] Filed: Sep. 22, 1998

[51] Int. Cl.[6] ................................................. A01K 15/02
[52] U.S. Cl. ............................................................. 119/711
[58] Field of Search .................................. 119/702, 709, 119/710, 711; 473/596

[56] References Cited

U.S. PATENT DOCUMENTS

| | | |
|---|---|---|
| D. 146,367 | 2/1947 | Mahler . |
| D. 358,911 | 5/1995 | Hotta et al. . |
| D. 359,147 | 6/1995 | Hotta et al. . |
| D. 359,600 | 6/1995 | Hotta et al. . |
| 2,115,926 | 5/1938 | Hatton ..................................... 119/702 |
| 2,521,703 | 9/1950 | Emmitt ..................................... 473/596 |
| 2,546,896 | 3/1951 | Kassuba ..................................... 473/596 |
| 4,321,888 | 3/1982 | Topliffe . |
| 5,207,420 | 5/1993 | Crawford et al. ..................... 473/596 |
| 5,230,682 | 7/1993 | Myers . |
| 5,265,559 | 11/1993 | Borell . |
| 5,282,777 | 2/1994 | Myers . |
| 5,351,652 | 10/1994 | Budman et al. . |
| 5,377,625 | 1/1995 | Budman et al. . |
| 5,676,611 | 10/1997 | Foster et al. ............................. 473/596 |
| 5,857,431 | 1/1999 | Peterson ................................... 119/710 |
| 5,870,971 | 2/1999 | Krietzman et al. ....................... 119/707 |

*Primary Examiner*—Thomas Price

[57] ABSTRACT

A recreational and amusement device for a dog takes the form of a ball having a substantially spheroidal profile. The exterior wall of the ball is shaped to form surfaces of a main body and surfaces of two substantially identical handles spaced approximately 180° apart and lying within the substantially spheroidal profile. The main body includes an outer surface which conforms to the substantially spheroidal profile and a plurality of inboard surfaces extending between different locations on the substantially spheroidal profile. The handles include outer surfaces lying within the substantially spheroidal profile of the ball and inner surfaces opposing respective ones of the inboard surfaces of the main body. The inner surfaces of the handles and the inboard surfaces of the main body form contours which bound openings extending through the substantially spheroidal profile. The handles and openings are sized and shaped to receive the snout of the dog to permit the dog's mouth to extend completely around either of the handles to grip the ball. When one of the handles is so gripped, the opposite handle may be grasped by a human who can pull on the ball to play with the dog. Preferably, the ball is formed from two molded half portions which are substantially identical and is made of plastic, rubber, vinyl or other elastomeric material which is sufficiently resilient to bounce.

22 Claims, 4 Drawing Sheets

RECREATIONAL AND AMUSEMENT DEVICE FOR ANIMALS

BACKGROUND OF THE INVENTION

1. Field of the Invention

The present invention relates to recreational and amusement devices for animals and, more particularly, to a ball having handles suitable for being gripped in the mouth of a dog.

2. Description of the Related Art

Various ball-type pet toys have been proposed which include projecting straps or tethers that enable a pet, such as a dog or a horse, to easily grip and play with the ball. For example, U.S. Pat. No. 4,321,888, incorporated herein by reference in its entirety, discloses a ball having plural handles formed by looping cords through openings defined in the ball. Dogs can grasp the handles to play with one another or with a person. U.S. Pat. No. 5,265,559, incorporated herein by reference in its entirety, discloses a pet toy in the form of a ball having an external handle to which a flag is attached to permit a dog to easily grasp the flag and play with the ball. U.S. Pat. No. 5,207,420, incorporated herein by reference in its entirety, discloses a ball suitable for use with horses having multiple solid ribs projecting from the ball by which an animal can grasp and play with the ball.

One disadvantage of such pet balls is that the projecting straps or tethers tend to reduce the ball's ability to roll freely, which may reduce the pet's interest in the ball. Further, the projections can easily snag on other objects as the ball moves.

Other ball-shaped pet toys which do not include projections that extend beyond the profile of the ball are known. Such balls may include an irregular surface, recesses or holes which allow the pet to grip the ball. However, no such pet toys are known which include plural or opposing handles or gripping devices within the profile of the ball to permit the ball to be grasped simultaneously by the pet and a human in order to allow a person to interactively play with the pet. Accordingly, there remains a need for a recreational and amusement device for pets which rolls freely and which can be simultaneously grasped and pulled via opposing handles or the like.

SUMMARY OF THE INVENTION

It is an object of the present invention to provide a recreational and amusement device for an animal, such as a dog or other pet, which is capable of easily rolling and bouncing.

It is a further object of the present invention to provide a recreational and amusement device which an animal grips with its teeth or mouth.

Yet another object of the present invention is to provide a recreational and amusement device which can simultaneously be gripped by an animal and a human so that the device can be tugged or pulled to play with the animal.

The aforesaid objects are achieved individually and in combination, and it is not intended that the present invention be construed as requiring two or more of the objects to be combined unless expressly required by the claims attached hereto.

According to the present invention, a recreational and amusement device for an animal takes the form of a hollow ball having a substantially spheroidal profile. The exterior wall of the ball is shaped to form surfaces of a main body and surfaces of two substantially identical handles spaced approximately 180° apart and lying within the substantially spheroidal profile. The surfaces of the main body formed by the exterior wall of the ball include an outer surface which conforms to the substantially spheroidal profile and a plurality of inboard surfaces extending between different locations in the substantially spheroidal profile. The surfaces of the handles formed by the exterior wall of the ball include outer surfaces lying within or conforming to the spheroidal profile of the ball, and inner surfaces opposing respective ones of the inboard surfaces of the main body. The inner surfaces of the handles and the inboard surfaces of the main body form contours which bound and define openings extending through the substantially spheroidal profile. The handles and openings are sized and shaped for a snout of an animal, such as a dog, to permit the mouth of the dog to extend completely around either of the handles to grip the ball. When one of the handles is so gripped, the opposite handle may be grasped by a human who can pull on the ball to play with the dog.

The exterior wall of the hollow ball can be substantially continuous, with the exterior wall forming a substantially totally enclosed interior comprising an interior of the main body in flow communication with an interior of the handles. Alternatively, the handles of the ball can be solid with a hollow main body, or the entire ball can be solid.

Optionally, one or more slits or openings can be formed in the ball to allow dog food stored within the ball to egress through the opening when played with by a dog. For example, a slit can be formed along one of the inboard surfaces. When external force is applied to the ball (e.g., when played with by a dog), the shape of the ball deforms, causing the slit to open and allowing dog food to pass from the interior of the ball to the exterior.

Preferably, the ball is formed from two molded half portions which are substantially identical. The ball can be made of plastic, rubber, vinyl, polyvinyl chloride (PVC) or any other elastomeric material which is sufficiently resilient to bounce. Optionally, the ball is inflatable. Further, the ball can include a material treated to emit an aroma of food. For example, the ball can be impregnated with an aroma-producing substance to emit the aroma.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DESCRIPTION OF THE PREFERRED EMBODIMENTS

Figure 1:
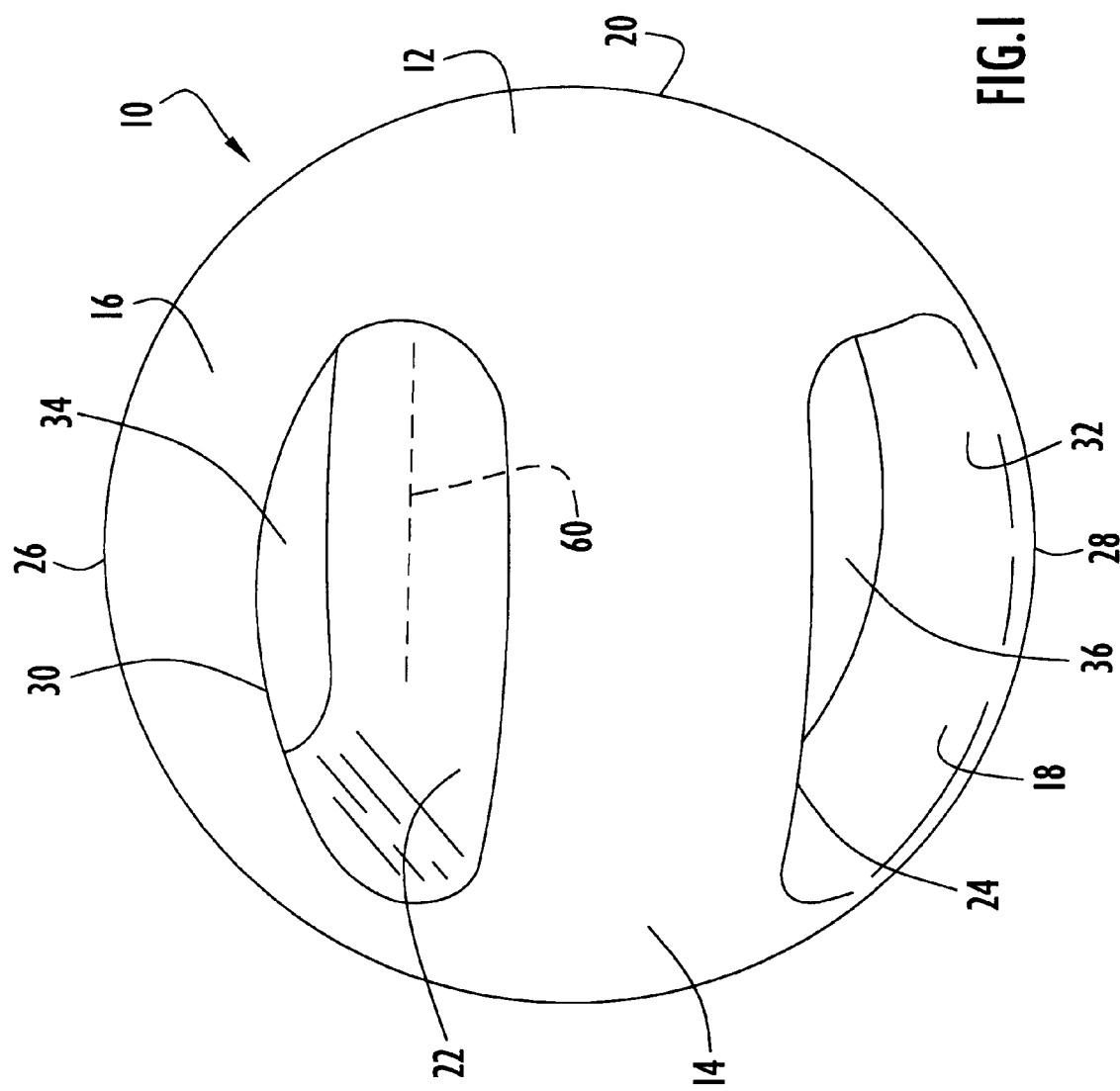
FIG. 1 is a perspective view of a dog ball in accordance with an exemplary embodiment of the present invention.
Figure 2:
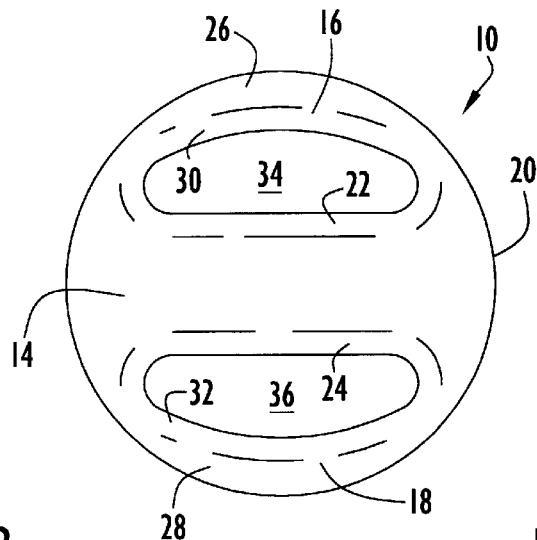
FIG. 2 is a side view in elevation of the dog ball in accordance with the exemplary embodiment of the present invention.

Referring FIGS. 1 and 2, in accordance with an exemplary embodiment of the present invention, an amusement and recreation device for an animal takes the form of a dog ball 10. Ball 10 has a substantially spheroidal profile and, more particularly, a substantially spherical profile. As used herein, the term "substantially spheroidal profile" means that the exterior surface of the ball lies substantially along or within an imaginary spheroid, with much of the exterior surface of the ball substantially conforming to the surface of the imaginary spheroid. Likewise, the term "substantially spherical profile" means that the exterior surface of the ball lies substantially along or within an imaginary sphere, with much of the exterior surface of the ball substantially conforming to the surface of the imaginary sphere. That is, the terms "substantially spheroidal profile" and "substantially spherical profile" refer to the profile suggested by the spheroid-conforming or sphere-conforming surfaces of the ball, with substantially no part of the ball lying outside the spheroid or sphere. However, these terms do not preclude portions of the exterior surface of the ball from lying within the spheroidal or spherical profile and forming contours within the profile.

According to the exemplary embodiment illustrated in FIGS. 1 and 2, ball 10 is formed with a substantially continuous exterior wall 12. As used herein, the term "substantially continuous exterior wall" means that there are no large slits, holes, breaks, gaps or discontinuities in the exterior surface of the ball, although small openings such as an air hole or a valve for receiving an inflation device or for equalizing internal and external pressures are not precluded by this term. It should be noted, however, that for purposes of principles of the present invention, the exterior wall of ball 10 need not be substantially continuous. Exterior wall 12 of ball 10 is shaped to form surfaces of a main body 14 and surfaces of two handles 16 and 18 which lie within the substantially spherical profile. In an exemplary embodiment of the present invention, ball 10 has a diameter of approximately eight inches. It is to be understood that this diameter is provided by way of example only and is not in any way limiting on the scope of the invention.

The surfaces of main body 14 formed by exterior wall 12 include an outer surface 20 which conforms to the substantially spherical profile of ball 10 and two inboard surfaces 22 and 24. Each of inboard surfaces 22 and 24 extends from the outer surface 20 of main body 14 at one location on the spherical profile, through the interior of the spherical profile, to the outer surface 20 of main body 14 at another location on the spherical profile. In accordance with the exemplary embodiment shown in FIGS. 1 and 2, inboard surfaces 22 and 24 lie generally along two respective parallel planes disposed on opposite sides of a plane perpendicularly bisecting ball 10.

Handles 16 and 18 are formed integrally with the main body 14 and lie within the spherical profile of ball 10 under non-stress conditions. Depending on the composition of ball 10, handles 16 and 18 and main body 14 may be somewhat deformable when external forces, such as pushing, pulling, twisting or squeezing, are applied. "Under non-stress conditions" refers to conditions under which ball 10 is not subject to external forces which tend to deform the original or natural shape of ball 10. As shown in FIGS. 1 and 2, handles 16 and 18 are substantially identical and are spaced approximately 180° apart on ball 10. However, the handles on ball 10 can be located at any spaced-apart angle (e.g., 90° or 120°). Further the ball of the present invention can include more than two handles uniformly or irregularly spaced on the ball, and such handles need not be identical.

The surfaces of handles 16 and 18 formed by exterior wall 12 include respective outer surfaces 26 and 28 which conform to the substantially spherical profile of ball 10 and respective inner surfaces 30 and 32 which respectively oppose inboard surfaces 22 and 24 of main body 14. Handles 16 and 18 and their respective outer surfaces 26 and 28 are entirely within the spherical profile of ball 10 under non-stress conditions so as not to project outwardly from that profile. Inner surface 30 of handle 16 forms a continuous, loop-shaped contour with inboard surface 22 of main body 14, which loop-shaped contour bounds and defines an opening 34 extending through the substantially spherical profile of ball 10. Inner surface 32 of handle 18 forms a similar continuous, loop-shaped contour with inboard surface 24 of main body 14, which loop-shaped contour bounds and defines an opening 36 extending through the substantially spherical profile of ball 10. Openings 34 and 36 lie on opposite sides of a plane bisecting ball 10, radially inward of handles 16 and 18, respectively. From a conceptual standpoint, handles 16 and 18 can be thought of as being formed by "removing" portions of a sphere or by forming tunnels through a sphere.

Figure 3:
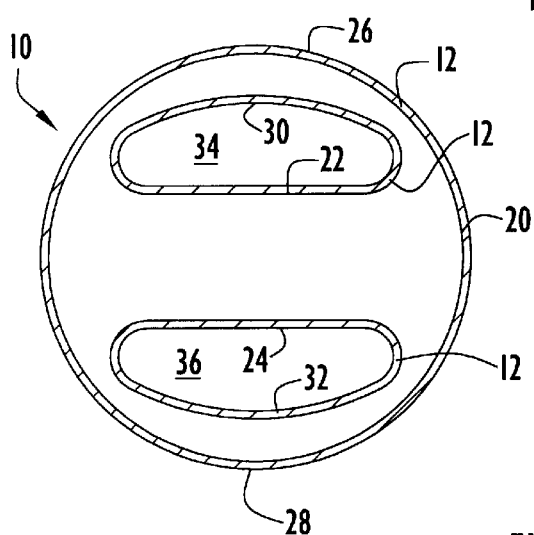
FIG. 3 is a sectional view of an embodiment of the dog ball of the present invention in which the main body of the ball and the handles are hollow.
Figure 4:
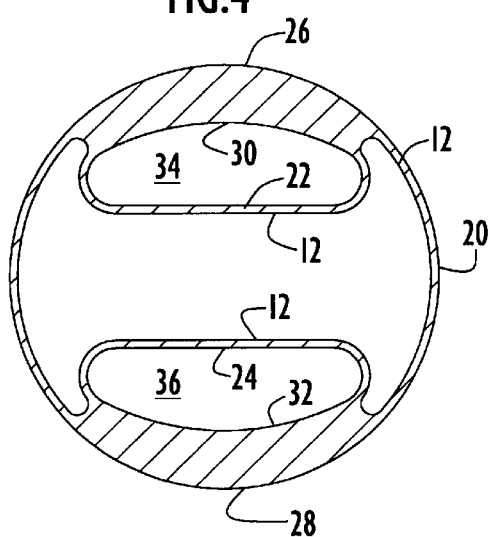
FIG. 4 is a sectional view of an embodiment of the dog ball of the present invention in which the main body of the ball is hollow and the handles are solid.
Figure 5:
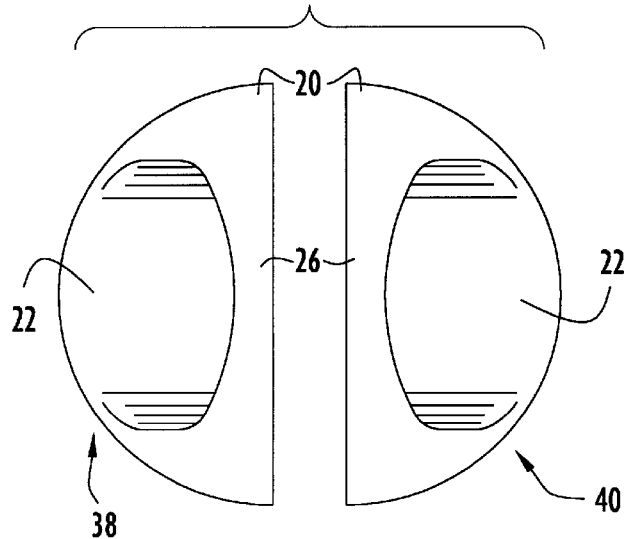
FIG. 5 is a side view of two molded half sections forming the dog ball of the present invention.

FIGS. 3–5 illustrate the construction of ball 10. FIG. 3 illustrates a cross-section of ball 10 along a bisecting plane substantially perpendicular to the planes along which inboard surfaces 22 and 24 generally lie. In accordance with the embodiment shown in FIG. 3, ball 10, including main body 14 and handles 16 and 18, is hollow, with substantially continuous exterior wall 12 forming a substantially totally enclosed interior (except for small openings such as an air hole or the like) comprising the interior of the main body 14 in air flow communication with the interiors of handles 16 and 18.

According to another embodiment of the present invention shown in FIG. 4, main body 14 of ball 10 can be hollow, while handles 16 and 18 are solid to provide superior puncture resistance and greater strength and durability to withstand externally-applied forces such as compression, pulling and twisting forces. If desired, handle strength and durability can be achieved by using a stronger polymer for the hollow or solid handles than for the main body. Optionally, main body 14 can also be solid to form a completely solid ball.

As shown in FIG. 5, ball 10 can be formed from two substantially-identical molded half portions 38 and 40 using conventional molding procedures. Ball 10 can be formed of a relatively firm but deformable material such as a semi-hard or softer plastic which deforms in response to significant force but rapidly regains its original shape once force is removed. Ball 10 can also be formed of rubber, vinyl, polyvinyl chloride (e.g., 55 durometer PVC) or other elastomeric material. Preferably, the material forming ball 10 is resilient enough to permit the ball to bounce when dropped from a height of at least one foot. The ball can be non-pressurized, with a small air hole allowing ingress and egress of air to improve compressibility and deformability, or ball 10 can be inflatable via a valve for receiving a pressurizing air supply through an inflation needle or the like. The exterior wall 12 of ball 10 can be smooth or can have nodules or dimples to improve grip.

Figure 6:
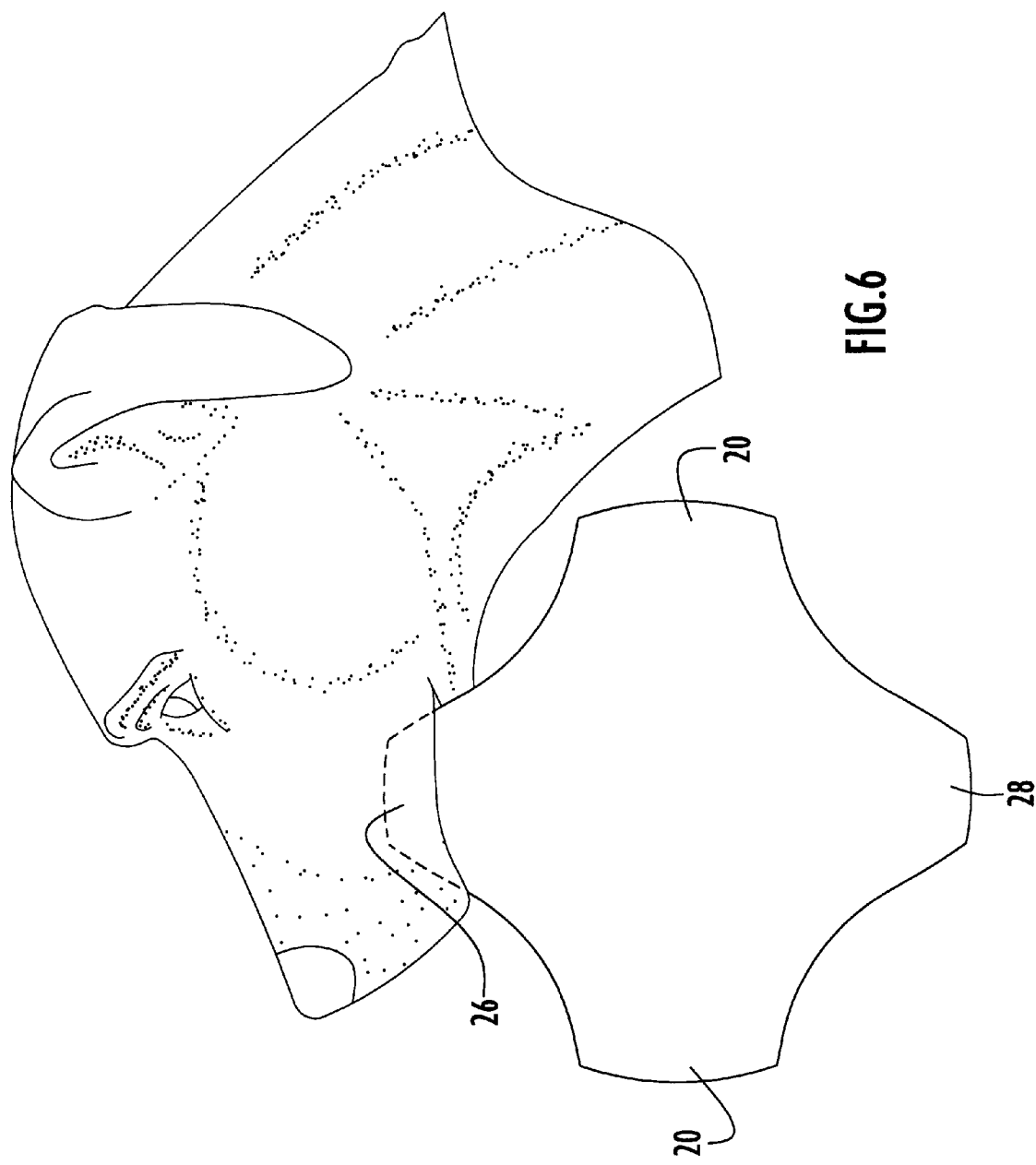
FIG. 6 is an illustration of a handle of ball of the present invention being gripped in the mouth of a dog.
Figure 7:
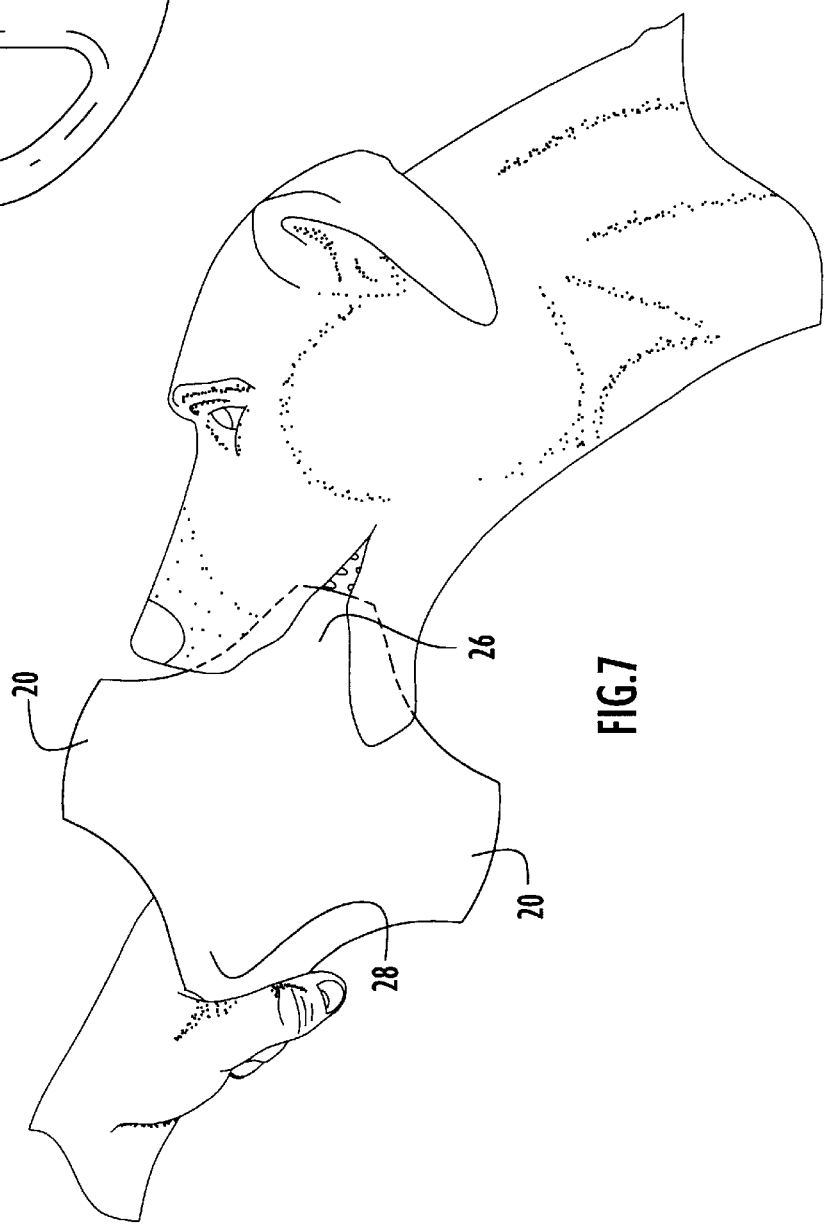
FIG. 7 is an illustration of two opposing handles of the ball of the present invention being simultaneously gripped by a dog and a human hand.

An important aspect of the present invention is the provision of multiple handles disposed within the spherical profile of the ball. Specifically, multiple handles permit the ball to be simultaneously grasped by two dogs or by a dog and a human so that the ball can be used as a pull toy. As shown in FIG. 6, each of handles 16 and 18 and each of openings 34 and 36 are sized and shaped to receive a snout of a dog to permit the handle to be gripped in the mouth of the dog, with the dog's lower jaw extending through the opening and the dog's mouth extending completely around the handle. Further, handles 16 and 18 and openings 34 and 36 are sized and shaped to permit the fingers of a human hand to extend through openings 34 and 36 and to wrap completely around handles 16 and 18 so that the handles can be firmly grasped. As illustrated in FIG. 7, the two handle construction of ball 10 allows ball 10 to be used as a pull toy, wherein the dog engages and pulls one handle with its teeth while a human grasps and pulls on the opposing handle to play with the dog. Unlike conventional ball-shaped pet toys having projections which impede a rolling motion, because the handles of the ball of the present invention lie within and conform to the spherical profile of the ball, the handles do not impede rolling motion of the ball of the present invention.

Figure 8:
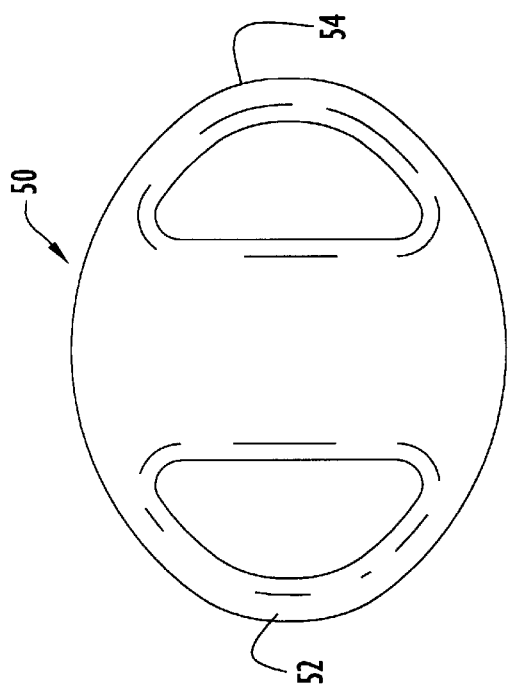
FIG. 8 is a side view in elevation of a dog ball having a substantially prolate spheroidal profile in accordance with another embodiment of the present invention.

In the exemplary embodiment shown in FIG. 1, ball 10 has a substantially spherical profile. More generally, the recreational and amusement device of the present invention can take the form of a ball having other spheroidal profiles. In accordance with another embodiment shown in FIG. 8, a dog ball 50 has a substantially prolate spheroidal profile. The term prolate spheroid refers to a spheroid having a major, longitudinal axis longer than its minor axis, with a circular transverse cross section which decreases from the longitudinal center (in a plane containing the minor axis) to the longitudinal ends. In accordance with the present invention, the ratio of the length of ball 50 along the major longitudinal axis to the width of ball 50 along the minor axis is preferably in the range between 1:1 and 2:1. For example, the length and width of ball 50 can be 10 inches and 8 inches, respectively. Ball 50 includes two handles 52 and 54 located at the longitudinal ends of ball 50, which lie within the substantially prolate spheroidal profile. It will be noted, however, that, as with ball 10 described above, ball 50 can include any plural number of handles which can be positioned at any spaced-apart locations on the ball.

According to another aspect of the present invention, the material from which the ball is formed is optionally treated with a substance that emits an aroma that is appealing to a dog in order to entice a dog to play with the ball. Typically the aroma emitted will be that of food appealing to a dog. Preferably, the substance is impregnated into the material of the ball in a conventional manner; other known processes for rendering the material aroma-emitting may be employed. Whatever the technique, the emission from the ball of an aroma that appeals to a dog increases the likelihood that the dog will play with the ball.

Optionally, a slit or opening through which food, such as dry dog food, can pass may be formed in the ball. By way of non-limiting example, as shown with a dashed line in FIG. 1, an optional slit 60 is formed along the center of inboard surface 22 (e.g., along the seam between the two half portions) and extends in a direction parallel to handle 16. Under non-stress conditions, slit 60 is "closed" (i.e., the opposing edges of the ball along the slit are immediately adjacent or in direct contact) to discourage moisture or foreign matter from getting into the interior of the ball. When the ball is deformed by pushing, pulling or twisting, the opposing edges along the slit separate, thereby forming a gap through which food can pass. When played with by dog, food stored in the hollow interior of the ball egresses through the gap formed while the ball is deformed. Other than slit 60, the ball preferably has a substantially continuous exterior wall.

According to another approach, an opening, such as a round hole, can be formed on at least one of the inboard surfaces 22 and 24 to allow food stored in the hollow interior of the ball to drop out of the ball. Optionally, the size of the opening can be controlled by inserting in the opening a disk-shaped device having a fixed plate member and an overlying, concentric, rotatable plate member. Both the fixed plate member and the rotatable plate member have openings which can be overlapped to a desired degree by rotating the rotatable plate member to control the size of the opening (i.e., from non-overlapping to perfectly aligned). If it is desired not to use food with the ball, a plug, such as a snap-in plug, can be used to plug the opening.

It will be understood that the ball of the present invention is not limited to use by a dog; the ball may be shaped and sized to be suitable for other animals which may be inclined to grasp, pull on or otherwise play with a ball.

Having described preferred embodiments of a new and improved recreational and amusement device for animals, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A recreational and amusement device for an animal, comprising:

a ball having a substantially spheroidal profile, and an exterior wall shaped to form surfaces of a main body and surfaces of a plurality of handles lying within the substantially spheroidal profile;

said main body having an outer surface which conforms to the substantially spheroidal profile and a plurality of inboard surfaces extending between different locations on the substantially spheroidal profile;

said handles having outer surfaces lying within the substantially spheroidal profile of said ball under non-stress conditions and inner surfaces opposing respective ones of said inboard surfaces of said main body, said inner surfaces and said inboard surfaces forming contours which bound openings extending through the substantially spheroidal profile;

wherein said openings are sized to permit the mouth of the animal to extend completely around said handles.

2. The device according to claim 1, wherein said handles and openings are contoured for a snout of a dog to permit either of said handles to be gripped in the mouth of the dog.

3. The device according to claim 1, wherein said plurality of handles is two handles.

4. The device according to claim 3, wherein said two handles are substantially identical and are spaced-apart by approximately 180°.

5. The device according to claim 1, wherein said exterior wall is substantially continuous.

6. The device according to claim 1, wherein the outer surface of each of said handles conforms to the substantially spheroidal profile of said ball.

7. The device according to claim 1, wherein said ball has a substantially spherical profile.

8. The device according to claim 1, wherein said ball has a substantially prolate spheroidal profile.

9. The device according to claim 8, wherein a ratio of a length of said ball along a major axis to a width of said ball along a minor axis is in the range between 1:1 and 2:1.

10. The device according to claim 1, wherein said ball is formed from two molded half portions which are substantially identical.

11. The device according to claim 1, wherein said ball is plastic.

12. The device according to claim 1, wherein said ball is formed of a resilient material capable of bouncing when dropped from a height of at least one foot.

13. The device according to claim 12, wherein said ball is inflatable and said resilient material is elastomeric.

14. The device according to claim 1, wherein said main body and said handles are hollow, with said exterior wall forming a substantially totally enclosed interior comprising an interior of said main body in flow communication with an interior of said handles.

15. The device according to claim 1, wherein said main body is hollow and said handles are solid.

16. The device according to claim 1, wherein said ball is solid.

17. The device according to claim 1, wherein said ball includes a material treated to emit an aroma of food.

18. The device according to claim 17, wherein said ball is impregnated with an aroma-producing substance to emit said aroma.

19. The device according to claim 1, wherein said handles and openings are shaped to permit fingers of a human hand to wrap completely around said handles.

20. The device according to claim 1, further comprising an opening formed on one of said inboard surfaces to permit food to pass between an interior of said ball and an exterior of said ball.

21. The device according to claim 20, wherein said opening is a slit formed in the exterior wall, said slit forming a gap permitting food to pass between the interior of said ball and the exterior of said ball when said ball is deformed by stress.

22. A recreational and amusement device for a dog, comprising:

a hollow ball having a substantially spherical profile;

said ball including a main body having two inboard surfaces extending between different locations on the substantially spherical profile; and two substantially identical handles spaced apart by approximately 180°, said handles having outer surfaces conforming to the substantially spherical profile of said ball under non-stress conditions and inner surfaces opposing respective ones of said inboard surfaces, said inner surfaces and said inboard surfaces forming contours which bound openings through the substantially spherical profile;

wherein said handles and openings are contoured to receive a snout of a dog to permit either of said handles to be gripped in the mouth of the dog with the mouth extending completely around either of said handles.

* * * * *